United States Patent [19]

Erickson et al.

[11] 4,055,377
[45] Oct. 25, 1977

[54] MAGNETICALLY ORIENTABLE RETROREFLECTORIZATION PARTICLES

[75] Inventors: Randall L. Erickson, North Oaks; Terry R. Bailey, Cottage Grove, both of Minn.

[73] Assignee: Minnesota Mining and Manufacturing Company, St.Paul, Minn.

[21] Appl. No.: 711,140

[22] Filed: Aug. 3, 1976

[51] Int. Cl.² ............................................. G02B 5/128
[52] U.S. Cl. ..................................... 350/105; 350/97; 350/103
[58] Field of Search ................. 350/105, 97, 286, 103, 350/109, 130, 98, 151, 162 R; 324/151; 343/909

[56] References Cited

U.S. PATENT DOCUMENTS

| | | | |
|---|---|---|---|
| 3,347,614 | 10/1967 | Fuller et al. | 350/162 R |
| 3,420,597 | 1/1969 | Nellesen et al. | 350/105 |
| 3,508,215 | 4/1970 | Cohler et al. | 350/162 R |
| 3,545,843 | 12/1970 | Somers et al. | 350/162 R |
| 3,700,305 | 10/1972 | Bingham | 350/105 |
| 3,758,192 | 9/1973 | Bingham | 350/105 |

Primary Examiner—John K. Corbin
Assistant Examiner—B. W. delos Reyes
Attorney, Agent, or Firm—Cruzan Alexander; Donald M. Sell; Roger R. Tamte

[57] ABSTRACT

Novel magnetically orientable retroreflectorization particles permit application of highly oriented retroreflective coatings. The retroreflectorization particles individually comprise at least one transparent microsphere, specular reflective means in optical connection with a first portion of said microsphere so as to provide retroreflection of light incident on the opposed portion of the microsphere, and a magnetic layer underlying said specular reflective means and having a magnetic axis parallel to the optical axis on which said first and opposed portions of the microsphere are aligned. When the particles are applied to a substrate in the presence of a magnetic field having flux lines of appropriate polarity perpendicular to the substrate, the particles tend to become aligned in a common direction that retroreflects light incident on the coating.

20 Claims, 10 Drawing Figures

MAGNETICALLY ORIENTABLE RETROREFLECTORIZATION PARTICLES

BACKGROUND OF THE INVENTION

Ever since retroreflective coating materials were first commercially provided in the late 1950's, there has been a desire for increased retroreflective brightness from the coatings. The problem has been that the retroreflective elements used in these coating materials, i.e. flour-grain-sized hemispherically metal-coated glass microspheres dispersed in a liquid paint vehicle (see Palmquist et al, U.S. Pat. No. 2,963,378), become randomly oriented when the coating material is applied to a substrate. Typically, only about one-third of the microspheres are aligned with their uncovered portion facing outwardly in an applied coating, and the result is a significant reduction in the intensity with which the coating retroreflects incident light.

The same deficiency exists to a lesser extent in a recently developed system for retroreflectorizing fabrics and other substrates using minute retroreflectorization particles. As taught in a copending application, Bingham and Bailey, U.S. Ser. No. 540,286, filed Jan. 10, 1975, each retroreflectorization particle comprises one or more microspheres arranged as a closely packed monolayer and supported and partially embedded in a binder material that may be softened to adhere the particle to the fabric. The particles are typically cascaded onto the fabric and adhered there in a sparse arrangement which produces a surprising combination of inconspicuousness under ordinary daytime viewing conditions and striking visibility when viewed under illumination by automobile headlamps at night.

However, not all of the retroreflectorization particles cascaded onto a fabric become adhered in position to retroreflect light. The effect is to increase the number of particles that must be applied, preventing even further reductions in daytime conspicuity that would significantly widen the potential scope for such treatments.

The prior art has tried several approaches to increase orientation of retroreflective elements in applied retroreflective coatings. Probably the most successful approach has involved covering the whole surface of microspheres with metal; applying a coating of such microspheres (either by cascading them onto a previously applied, partially dried layer of binder material, or preferably by applying them in admixture in a paint vehicle, which is then dried, see Nellessen et al, U.S. Pat. No. 3,420,597); and then etching away the metal from the top portions of the applied coating of microspheres. However, this method has several disadvantages— it requires a presently expensive whole-surface coating of microspheres; an extra step after formation of the coating; and, as to sparse coatings on fabrics, a wasteful and possible damaging application of etchant to the large uncovered areas of the fabric. Despite utility for some purposes, this approach has not been widely practiced.

No other approach has provided the necessary characteristics either, and there remains a need for retroreflective coating materials by which retroreflective coatings may be formed in situ on a substrate and yet have a high degree of orientation of retroreflective elements that achieves brilliant retroreflection.

SUMMARY OF THE INVENTION

The present invention provides new magnetically orientable retroreflectorization particles that may be applied directly to a substrate to form, in essentially one step, highly oriented retroreflective coatings. These new retroreflectorization particles each comprise at least one transparent microsphere, specular reflective means in optical connection with a first portion of the microsphere so as to provide retroreflection of light incident on the opposed portion of the microsphere, and a magnetic layer underlying the specular reflective means and having a magnetic axis that is parallel to the optical axis of the retroreflectorization particles along which said first and opposed portions of the microsphere are aligned.

The terms used in the preceding paragraph are standard or self-explanatory, but for purposes of clarity are defined here as follows: "magnetic" means magnetized or capable of being magnetized; "magnetic axis" is a north-south magnetic polarity produced by magnetization of the magnetic layer, or an axis of easy magnetization in case the layer is not presently magnetized; "optical connection" is preferably achieved by applying a specular reflective means, i.e. a hemispherical coating of metal, directly on the microsphere, or alternatively by separating the specular reflective means from the microsphere by only transparent material; and "optical axis" is established by the combination of the specular reflective means with the microsphere, the specular reflective means for each microsphere being transverse to the optical axis, and the first portion of the microsphere (i.e. the "back" portion) and the opposed portion (i.e. the "front" portion) being aligned along the optical axis, such that light incident on the front portion of the microsphere is transmitted through the microsphere to the specular reflective means, and then returned through the microsphere along substantially the same path that the light originally travelled to the microsphere.

The described retroreflectorization particles in effect act as miniature magnets when placed in an external or applied magnetic field. The particles tend to orient in the external field, with their magnetic axes, and accordingly their optical axes, aligned with the magnetic lines of force of the field. The magnetic field is generally applied so that the lines of force are perpendicular to the substrate to be coated, and so that the polarity of the field will cause the particles to be positioned in the desire "upright" position on the substrate, i.e. with the front or optically exposed surface of the microspheres facing upwardly or away from a substrate being coated, ready to retroreflect light incident on the substrate. Thus, if the front portion of the microspheres coincides with a north pole and the back portion of the particle corresponds with a south pole, the substrate to which the particles are to be applied should present a north magnetic pole to the particles, either because the substrate is itself magnetized, or more typically because the substrate is placed over the north pole of a magnet.

It has been found that when retroreflectorization particles as described are applied and adhered to a substrate such as fabric in the presence of a magnetic field as described, a large percentage of the particles become adhered in the upright position. As a consequence, substantially fewer particles, typically at least 40 percent less, can be applied to achieve the same retroreflective brightness as achieved by particles that do not have the magnetized character of the particles of the invention. Such a reduction in the number of particles applied makes a significant reduction in daytime conspicuity of an applied treatment, and further improves the hand, feel, and breathability of the treatment.

OTHER BACKGROUND PRIOR ART

Two patents that have a peripheral relevance, but do not lead to the present invention are as follows:

Gayle, U.S. Pat. No. 3,868,294 suggests forming reflective sheeting by spraying metal-coated transparent fibers onto an adhesive-coated metal sheet through an electrostatic spray gun. When the metal sheet is perpendicular to the stream of sprayed fibers, the fibers are said to become adhered onto the metal sheet with their longitudinal axis disposed at an angle of 90° to the sheet.

However, this patent offers no technique for improving retroreflection (return of light rays along substantially the same path as the light rays traveled to the sheeting). The method taught in the patent appears dependent on the use of fibers (the fibers presumably carry an elctrostatic charge of the same sign, causing the fibers to repel one another and maintain themselves in a parallel condition), which are not useful to provide retroreflection. Retroreflection, which is an essential property for obtaining maximum return of light to a motorist approaching an object covered with a reflective treatment, is the whole object of the present invention. The present invention provides retroreflective elements with a polarity that makes possible their optimum orientation, and Gayle offers no teaching as to how to achieve that.

Tate, U.S. Pat. No. Re. 25,363 teaches a magnetic writing materials set, which in one form comprises two layers of magnetically orientable hemispherically colored spheres supported in a liquid disposed between two sheets, one of which is transparent and formed with pockets to receive individual spheres. The spheres are prepared by mixing magnetizable barium ferrite particles and plaster of paris, molding the mixture into spheres, allowing the spheres to harden, magnetizing the spheres to have a magnetic polarity, and painting the hemisphere centered about one magnetic pole of the spheres a dark color.

This magnetic writing kit teaches nothing about retroreflection, does not contemplate retroreflectorization particles that can be applied onto a surface to form a retroreflective coating, and does not suggest how already-formed transparent microspheres may be incorporated into retroreflectorization particles having a desired magnetic polarity. Magnetization as a technique is of ancient origin, but until the present invention it was never applied to achieve the long-desired oriented retroreflective coatings.

DETAILED DESCRIPTION

Figure 1:
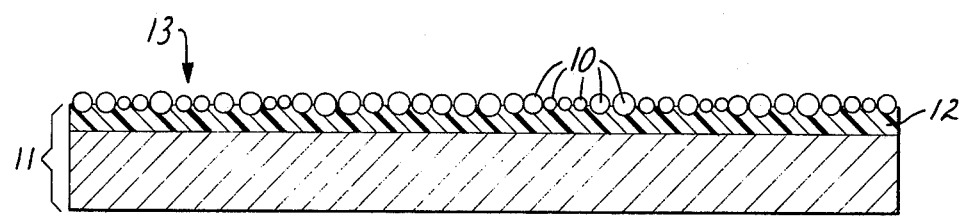
FIGS. 1-4 are enlarged sectional views through portions of various intermediate-stage products formed in the course of manufacturing retroreflectorization particles of the invention.

The invention will first be illustrated by the following examples, which are discussed with reference to the illustrative showings in the drawings, beginning with FIG. 1.

EXAMPLE 1

Transparent glass microspheres 10 of 1.92 refractive index and 50 micrometers average diameter were cascaded onto a preheated polyethylene-coated high-strength Kraft paper 11, and the paper passed for about one and one-half minutes through an oven heated to 250° F (121° C). Thereupon, the microspheres 10 sank to a depth of about 30 percent of their diameters in the polyethylene coating 12 to form a product 13 such as shown in FIG. 1.

Figure 2:
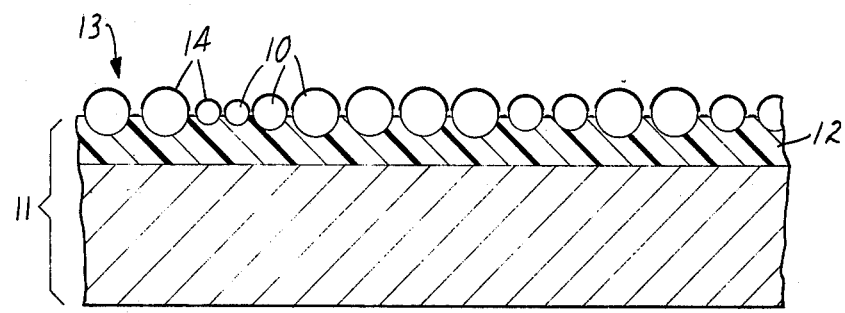

Aluminum was vapor-deposited onto the microsphere-covered surface of the web to a thickness of about 250 angstroms, forming an approximate hemispherical coating 14 of aluminum on the microspheres as shown in FIG. 2.

A solution of binder material was prepared by dissolving 50 parts of a thermoplastic polyester resin (understood to be the reaction product of terephthalic acid, 1,2-cyclohexanedicarboxylic acid, ethylene glycol, diethylene glycol, and cyclohexanedimethanol; Bostik 7979 resin made by USM Corp. of Middleton, Mass.) in 25 parts of toluene and 25 parts of Solvesso 100 solvent; and then adding 0.16 part of a solution prepared by mixing 40 parts of para-toluenesulfonic acid, 30 parts xylol, and 30 parts isopropanol.

Figure 3:
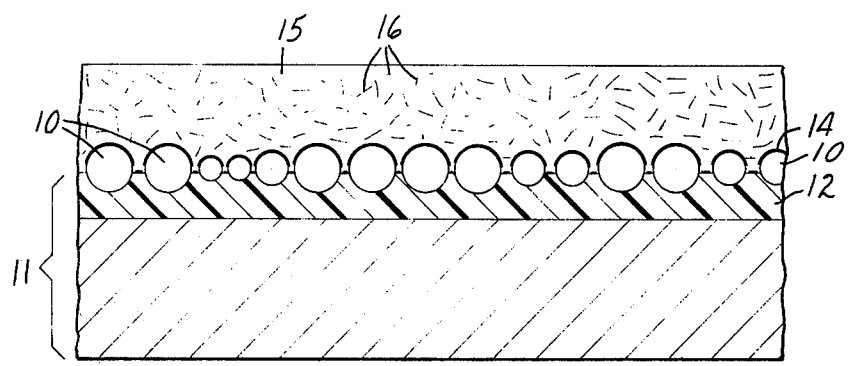

To 100 parts of the solution of binder material (the binder material is denominated 15 in FIGS. 3, 4, 6 and 7 of the drawings) was added 3 parts of barium ferrite magnetizable pigment particles 16. The particles 16 had a somewhat hexagonal platelet shape, as represented in FIG. 5, with an average length across the large-area surface (the dimension 17 in FIG. 5) of about 1 micrometer, and an axis of easy magnetization (represented by the arrow 18) perpendicular to their large-area surface dimension 17. The particles were mixed into the solution of binder material using an air mixer for approximately 10 minutes. The resulting coating material was knife-coated onto the metal-coated surface of the previously described web using a gap of 0.006 inch (150 micrometers). The web was passed under the knife-coater at a rate of approximately 10 feet/minute (3 meters/minute) and then through an oven heated to 200° F (93° C) for about one minute, leaving a product as shown in FIG. 3.

Figure 8:
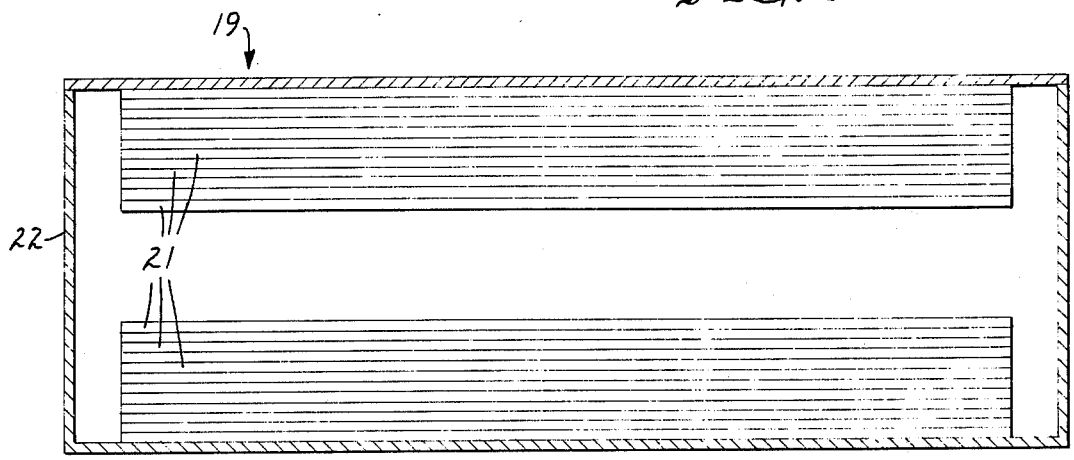
FIG. 8 is a sectional view through illustrative apparatus for preparing retroreflectorization particles of the invention.

At the end of the oven the web passed through a magnetic orienting device 19 such as shown in FIG. 8, which produced a uniform magnetic field having flux lines perpendicular to the plane of the web. This device included stacked sheets 21 of flexible permanent magnets as described in Blume, U.S. Pat. No. 2,999,275, composed of barium ferrite platelet particles in a flexible or elastomeric matrix, having a north pole on one large-area face and a south pole on the opposite face. The polymer-based magnet sheets 21 were surrounded by a ring 22 of steel, which returned the magnetic flux and minimized any reverse field beyond the edges of the magnet sheets. In this example, the device exhibited a magnetic field of 850 oersteds in the center of the device and a maximum reverse field of 20 oersteds.

The heating of the web prior to passage through the magnetic orienting device 19 had left the binder material 15 in a highly viscous condition that permitted the magnetic field of the device to rotate the barium ferrite platelets, but prevented the particles from becoming unoriented by the reverse field or by vibrations of the web during subsequent drying steps. The magnetic field oriented the particles so that their axis of easy magnetization 18 was perpendicular to the web. After orientation of the magnetizable particles, the web was run through a series of three additional connected ovens to further dry the web and evaporate solvents; the oven temperatures and residence times for the three ovens were 120° F (53° C) and 1 minute; 190° F (88° C) and 1 minute; and 220° F (105.5° C) and 5 minutes, respectively.

Figure 4:
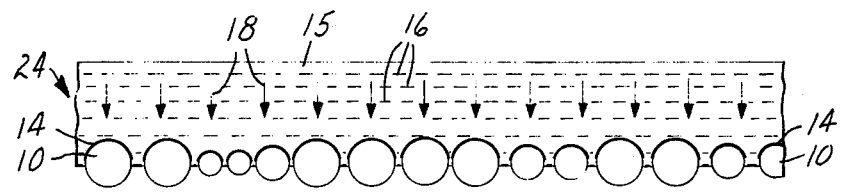
Figure 5:
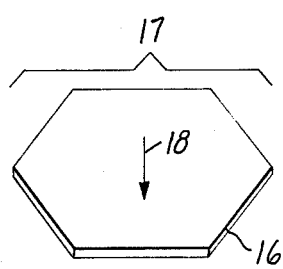
FIG. 5 is a perspective view of an illustrative magnetic particle used in retroflectorization particles of the invention.
Figure 6:
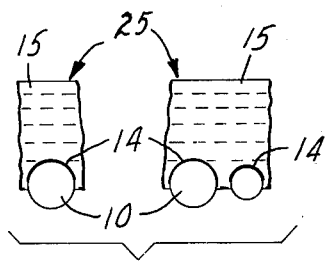
FIG. 6 is a sectional view through representative retroreflectorization particles of the invention.

The polyethylene-coated paper 11 was stripped away from the dried web, and the resulting sheet material 24 shown in FIG. 4 was placed in a Waring blender having a four-blade impeller which was run for about 30 seconds, resulting in a chopping and breaking of the film into small particles 25 as shown in FIG. 6. All the particles between 80- and 200-mesh (U.S. Standard) screens were collected; the nominal thickness of the particles in their smallest dimension was between 74 and 180 micrometers.

Figure 7:
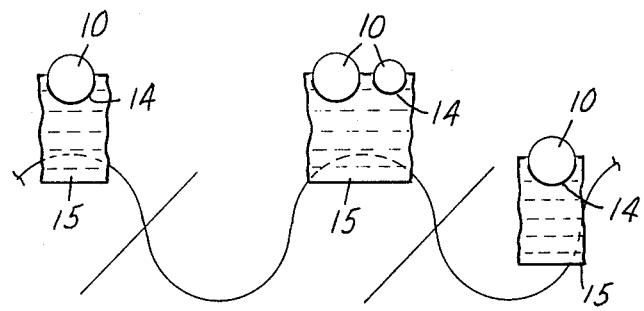
FIG. 7 is a schematic view showing retroreflectorization particles of the invention applied to a fabric.
Figure 9:
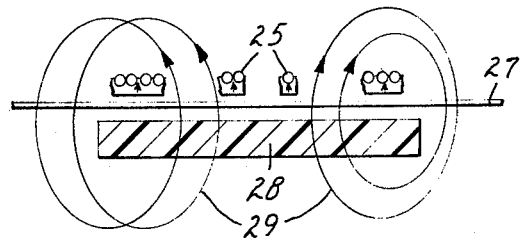
FIG. 9 is a schematic view of illustrative apparatus for applying retroreflectorization particles of the invention to a fabric.

A fabric 27 was retroreflectorized with the particles 25, to prepare a product as schematically shown in FIG. 7. This retroreflectorization was achieved by positioning the fabric over a polymer-based magnet sheet 28 in the manner shown in FIG. 9, and cascading a sparse coating of the particles onto the fabric. The flux lines 29 emanating from the magnet 28 were parallel and of the same magnetic polarity as the magnetic polarity and the particles 25 would exhibit when oriented in the desired manner on the fabric. For example, if the retroreflectorization particles 25 had a north pole on their exposed-glass (front) side, the magnet 28 should have a north pole on the large-area face disposed against the fabric 27 in FIG. 9. Conversely, if the particles 25 had a south pole on the exposed-glass side, the magnet 28 should have a south pole on the large-area face disposed against the fabric 27. The oriented particles were adhered to the fabric by heating both the fabric and the particles in a forced-air oven while under the influence of the magnetic field from the magnet 28, and allowing the fabric to cool, either within or outside the presence of the magnetic field.

In order to determine the extent to which retroreflectivity was improved by magnetic orientation of particles, two experiments were run.

EXPERIMENT 1

Retroreflectorization particles 25 as described above were dropped onto a sheet of paper which had been previously placed over a polymer-based magnet sheet. The polarity of the magnet sheet caused the particles to orient with the exposed surface of the microspheres up and the binder material down and against the paper. Particles that were the same as described in Example 1 except that no magnetic particles were present in the binder material were also cascaded onto the sheet of paper. A microscopic count of the particles facing upwardly was then made, with results as follows:

|  | Upright | | Other Directions | |
| --- | --- | --- | --- | --- |
|  | no. of particles | percentage | no. of particles | percentage |
| Magnetically orientable retroreflectorization particles (70–180 micrometer size range) | 768 | 98.1 | 15 | 1.9 |
| Retroreflectorization particles with no magnetic properties (70–180 micrometer size range) | 369 | 41 | 527 | 59 |

As seen, approximately 2.4 times as many magnetically orientable retroreflectorization particles were positioned correctly as nonmagnetized retroreflectorization particles.

EXPERIMENT 2

Two pieces of denim fabric were retroreflectorized using magnetic retroreflectorization particles of Example 1, one of the pieces of fabric (Sample A in the following table) being prepared in the presence of a magnetic field, and the other piece (Sample B) in the absence of such a field. The particles were applied in an amount of 0.6 gram per 6-inch-by-10-inch (387 sq. cm.) area of the fabric. The fabrics were heated after cascading of particles using a Torch lamp (600-watt heat lamp manufactured by Smith Victor Corp., Model TL-2) until the particles were set in place, placed in an oven heated to 400° F (204° C) for 25 seconds, and rolled with a rubber-surfaced hand-roller.

The prepared samples were then tested for retroreflective brightness, with results as follows (in candellas per square meter per lux):

| Sample | Average Before Heating With Lamp | Average After Heating With Lamp | Average After Heating and Rolling in Oven |
| --- | --- | --- | --- |
| A | 11.0 | 6.3 | 6.5 |
| B | 2.65 | 3.2 | 3.95 |

The change in the measured brightness levels after heating is primarily due to heat distortion of the applied retroreflectorization particles, which caused some of the magnetically oriented retroreflectorization particles to assume a less than perfect orientation (due to conformation of the particles after heating to the uneven surface of the fabric and to a spheroidization of the particles produced by surface tension of the heated binder material in the particles), and also caused some of the incorrectly positioned retroreflectorization particles on the samples prepared without a magnetic field to turn over into at least a partially correct position.

EXAMPLE 2

Retroreflectorization particles were satisfactorily prepared in the manner described in Example 1 except that the knife-coater was set at a gap of 0.005 inch (125 micrometers); the coating was dried for 10 minutes at 150° F (65° C) and for 20 minutes at 200° F (93° C) prior to passage through the magnetic orienting device; and the magnetic orienting device was replaced with a magnetic saturating device (an electromagnet producing a field of about 15,000 oersteds). Prior to application of the magnetic field, the binder material had dried to lock the barium ferrite particles into a randomly oriented position. The saturating field magnetized the particles in a direction perpendicular to the plane of the web, even though for most particles that was not the axis of easy magnetization; the magnetization of a particle was lessened by the extent to which the axis of easy magnetization for the particle was at an angle of less than 90° to the plane of the web. The direction of the applied field was perpendicular to the plane of the web and the web was passed through the field enough times to assure that the entire area of the web had been exposed to the magnetic field at least once.

EXAMPLE 3

Retroreflectorization particles were satisfactorily prepared in the manner described in Example 1 except that the barium ferrite particles were replaced with 3 parts of acicular particles of gamma iron oxide (averaging about 0.7 micrometer in length and 0.2 micrometer in diameter); the coating material was applied with a gap of 0.005 inch (125 micrometers); the magnetic orienting device comprised two ¼-inch-thick (6.4 millimeters-thick) polymer-based magnet sheets separated by a distance of about ½ inch (1.25 cm) positioned so that the two sheets magnetically attract each other; the coated web was dried for about 10 minutes at 200° F (93° C) while held between the two magnet sheets; and the web was heated for an additional 10 minutes at 200° F (93° C) after removal from between the magnet sheets.

EXAMPLE 4

Retroreflectorization particles were satisfactorily prepared in the manner described in Example 3 except that a thermoplastic acrylic resin consisting of a copolymer of ethyl acrylate and methyl methacrylate in an approximately 50-50 weight ratio (Acryloid B82 supplied by Rhom and Haas Company of Philadelphia, Pa.) was used instead of the polyester resin, and barium ferrite particles were used instead of gamma iron oxide particles.

EXAMPLE 5

A coating material was prepared by mixing the following ingredients in an air mixer until all of the resin was dissolved and the barium ferrite particles dispersed:

|  | Parts by Weight |
| --- | --- |
| Bostik 7979 resin | 50 |
| Toluene | 25 |
| Solvesso 100 | 25 |
| Barium ferrite | 3 |

Figure 10:
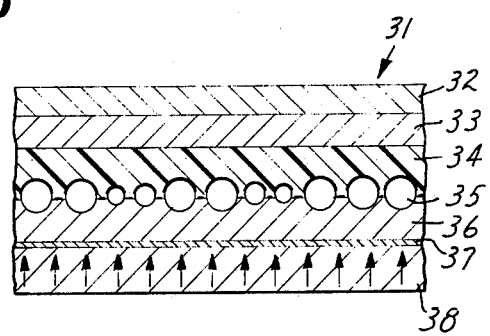
FIG. 10 is a sectional view through an intermediate-stage product prepared in the course of manufacturing an alternative retroreflectorization particle of the invention.

This solution was coated onto the back of a sheet material as shown in FIG. 10, which is generally prepared according to the teachings of Palmquist, U.S. Pat. No. 2,407,680. This sheeting consists of a liner 32, a transparent top film 33 of alkyd resin, a transparent binder coating 34 of alkyd resin, microspheres 35 having an index of refraction of 2.26, A transparent spacing layer 36 of polyvinyl butyral resin, and a layer 37 of vapor-deposited aluminum. The coating material 38 was applied using a knife-coater with a gap of 0.005 inch (125 micrometers), after which the coated web was placed in a magnetic fields established by polymer-based magnet sheets as described in Example 3 and the coating material then dried under the influence of that magnetic field for 10 minutes at 150° F (66° C) and 10 minutes at 200° F (93° C). The coated web was then removed from the magnetic field and dried an additional 10 minutes at 200° F (93° C). The liner 32 was removed and the resulting film placed in a Waring blender with dry ice and chopped for about 30 seconds. Particles between 20 and 80 mesh (180-850 micrometers) were then collected. The particles were dropped on a sheet of paper, placed over a magnet sheet and the orientation of the particles visually examined in a microscope and determined to be 98 percent correctly oriented for retroreflection.

A primary use for retroreflectorization particles as described in the above examples is to reflectorize fabric. For such a use, the retroreflectorization particles should be as small as practical. Preferably the retroreflectorization particles of the invention include on the average no more than about 10 microspheres, preferably no more than about 5 microspheres, and most preferably no more than about 3 microspheres. Retroreflectorization particles containing more than 10 microspheres can be satisfactorily used, even for reflectorizing fabrics (e.g., by coloring the retroreflectorization particle a color that matches the fabric); generally such particles will average no more than about 50 microspheres. Larger particles have several advantages; e.g., they require less chopping, which makes them less expensive and also causes less disruption of the retroreflective structure of the particles.

Over the whole treated surface of a fabric of the invention there should be on the average less than about 2,000 microspheres per square centimeter; preferably there are less than about 500, and more preferably less than about 300 microspheres per square centimeter. To achieve uniformity of effect, these numbers preferably also apply to any area of the treatment occupying one square centimeter. Generally sufficient microspheres are included to provide at least one candella, and preferably at least 2 candellas, of reflected light per square meter of a treated surface per lux of light that is incident on the surface. On the other hand, to minimize daytime visibility the treatment usually provides less than 20, and more often less than 10 candellas/square meter of treated surface per lux of incident light.

A variety of binder materials can be used in the retroreflectorization particles. Preferably, the binder material is a heat-activatable adhesive, softening upon exposure to elevated temperatures so as to wet and develop adhesion to the fabric. Examples of useful binder materials of this kind are polyesters, acrylics, polyurethanes, and polyamides. The binder material may also be activated or softened in other ways, such as by application of solvent.

Following application of particles to a fabric, the binder material hardens as by cooling, loss of solvent or other volatiles, or by chemical reaction including crosslinking or polymerizing. Illustrative chemically reactive materials include thermosetting resin compositions such as epoxy-based resin compositions, melamine-formaldehyde resin compositions, and acrylic-based resin compositions.

The layer of binder material in a retroreflectorization particle may comprise two or more sublayers. For example, in some embodiments the microspheres are embedded in one sublayer of binder material, and a second sublayer of magnetic-particle-filled binder material is used to bond the particles to fabric. Further, one sublayer such as a sublayer of magnetic-particle-filled binder material, may be preformed and then applied to a previously built microsphere-carrying sheet. Use of a binder material from the same chemical class as the fabric being treated is often advantageous.

Microspheres used in retroreflectorization particles of the invention generally have an index of refraction of at least 1.8 and preferably about 1.9. At the named indices, microspheres having an air interface achieve good reflective efficiency, especially when they carry a specular reflective coating directly on their embedded surface. Microspheres of lower refractive index can be used by spacing the specular reflective means from the microspheres with transparent materials of lower refractive index; and microspheres of higher refractive index, such as 2.25, can be used in combination with a spacing layer to obtain retroreflection when the microspheres are wet or covered with a transparent polymeric film.

The microspheres should average less than about 200 micrometers in diameter to achieve the least conspicuous treatment on a fabric, and preferably they average less than about 100 micrometers in diameter. However, larger microspheres may be used in retroreflectorization particles to be used for other purposes, and in any event they are generally at least 25 micrometers or larger in average diameter.

While metal layers provide useful specular reflective means, dielectric mirrors prepared in the manner taught in Bingham, U.S. Pat. No. 3,700,305, are also quite useful. Such coatings, which can be visibly transparent while reflecting sufficient light to provide good retroreflection, may improve the color or appearance of a reflective treatment by letting an underlying color, e.g., a colored binder material in the retroreflectorization particles, or the color of a garment, be visible through the reflective treatment. Reflective means can also be provided by use of a specular reflective material in the binder material underlying the microspheres; for example, a reflective pigment such as aluminum flakes or nacreous pigment (see Bingham, U.S. Pat. No. 3,758,192) may be dispersed in the binder material.

Barium ferrite particles are preferred magnetizable particles for use in retroreflectorization particles of the invention because of their high coercivity and their anisotropic character. When such particles are used and physically oriented with their axis of easy magnetization parallel to the optical axis for the particles, the retroreflectorization particles will become aligned in a magnetic field even if there is little if any magnetization of the particles. Since the retroreflectorization particles are unmagnetized, they are easier to handle and flow more freely during application to a substrate. Other useful magnetizable particles include strontium ferrite, acicular gamma iron oxide, and acicular iron particles. The magnetizable particles can be used in rather low amount, since only a low amount of magnetic energy is needed to rotate the very small and light weight retroreflectorization particles. However, generally they will be used in an amount of at least 0.5 weight-percent of binder material coated on the particles and preferably in an amount of at least 1 weight-percent of the binder material.

As seen from the examples, the field used to orient the magnetizable pigment during preparation of the retroreflectorization particles of the invention, and also the field used to orient the retroreflectorization particles during application to a fabric or other substrate, may be provided with either permanent or electromagnets. However, since permanent magnets provide useful results and are more simply used, they are generally preferred. Also, while physical orientation of magnetizable pigments within retroreflectorization particles, when used, is preferably achieved by a magnetic field, it may also be achieved by mechanical means, such as taught in Blume, U.S. Pat. No. 2,999,275.

Besides use of retroreflectorization particles of the invention to reflectorize fabric, they may be used to reflectorize other sheet materials. Further, retroreflectorization particles of the invention may be mixed into a liquid paint vehicle (comprising a film-forming binder material, which advances to a nontacky adherent paint film when applied to a substrate as a thin layer and exposed to an appropriate environment, and typically a volatile thinner in which the binder material is dissolved or dispersed) to form a coating composition of the type described in Palmquist et al, U.S. Pat. No. 2,963,378. Such a coating composition can be applied to a substrate in the presence of a magnetic field to achieve a high degree or orientation of retroreflective particles.

What is claimed is:

1. A mass of discrete retroreflectorization particles useful for forming a retroreflective coating on a substrate, the individual particles each comprising at least one transparent microsphere, specular reflective means in optical connection with a first portion of the microsphere so as to provide retroreflection of light incident on the opposed portion of the microsphere, and a magnetic layer underlying the specular reflective means and having a magnetic axis parallel to the optical axis on which said first and opposed portions of the microsphere are aligned, whereby when the particles are coated onto a substrate in the presence of a magnetic field having flux lines of appropriate polarity perpendicular to the substrate, the particles tend to become aligned in a common direction that retroreflects light incident on the coating.

2. Retroreflectorization particles of claim 1 which individually include from one up to an average of about ten transparent microspheres arranged as a closely packed monolayer and supported in a layer of binder material.

3. Retroreflectorization particles of claim 2 in which said magnetic layer comprises magnetic pigment dispersed in at least a portion of said binder material.

4. Retroreflectorization particles of claim 2 in which at least a portion of said binder material softens in the presence of heat to an adhesive state whereby the retroreflectorization particles will adhere to a substrate to which they are applied.

5. Retroreflectorization particles of claim 1 in which said specular reflective means is a coating applied directly to the microsphere.

6. Retroreflectorization particles of claim 5 in which said coating comprises a transparent thin layer having a refractive index $n_1$, the faces of said transparent layer being in contact with materials of refractive index $n_2$ and $n_3$, both $n_2$ and $n_3$ being at least 0.1 either higher or lower than $n_1$, and the transparent layer having an optical thickness corresponding to an odd-numbered multiple of about one-quarter wavelength of light in the wavelength range of about 3800 to 10,000 angstroms.

7. A coating composition comprising a liquid paint vehicle and retroreflectorization particles of claim 1 dispersed in the vehicle.

8. A method for reflectorizing a substrate comprising applying retroreflectorization particles of claim 1 to the substrate in the presence of a magnetic field having flux lines of appropriate polarity perpendicular to the substrate.

9. A method of claim 8 in which the substrate is a fabric.

10. Fabric carrying a sparse coating of retroreflectorization particles of claim 1.

11. A mass of discrete retroreflectorization particles useful for forming a retroreflective coating on a substrate, the individual particles each comprising one or more transparent microspheres arranged as a closely packed monolayer, a segment of binder material in which said microspheres are partially embedded, specular reflective means in optical connection with the embedded portion of the microspheres so as to provide retroreflection of light incident on the portion of the microspheres opposite from the embedded portion, and magnetic particles dispersed in said binder material and aligned so as to provide the retroreflectorization particles with a magnetic axis parallel to the optical axis on which said opposite and embedded portions of the microspheres are aligned, whereby when the particles are applied to a substrate in the presence of a magnetic field having flux lines of appropriate polarity perpendicular to the substrate, the particles tend to become aligned in a common direction that retroreflects light incident on the coating.

12. Retroreflectorization particles of claim 9 which include on the average up to about ten microspheres.

13. Retroreflectorization particles of claim 11 in which said binder material may at least in part be softened in the presence of heat to adhere the particles to a substrate.

14. Retroreflectorization particles of claim 11 in which said specular reflective means is a coating applied directly to the microspheres.

15. Retroreflectorization particles of claim 14 in which said coating comprises a transparent thin layer having a refractive index $n_1$, the faces of said transparent layer being in contact with materials of refractive index $n_2$ and $n_3$, both $n_2$ and $n_3$ being at least 0.1 either higher or lower than $n_1$ and the transparent layer having an optical thickness corresponding to an odd-numbered multiple of about one-quarter wavelength of light in the wavelength range of about 3800 to 10,000 angstroms.

16. Retroreflectorization particles of claim 11 in which said magnetic pigment comprises barium ferrite particles.

17. A coating composition comprising a liquid paint vehicle and retroreflectorization particles of claim 11 dispersed in the vehicle.

18. A method for reflectorizing a substrate comprising applying retroreflectorization particles of claim 11 to the substrate in the presence of a magnetic field having flux lines of appropriate polarity perpendicular to the substrate.

19. A method of claim 18 in which the substrate is a fabric.

20. Fabric carrying a sparse coating of retroreflectorization particles of claim 11.

* * * * *

UNITED STATES PATENT AND TRADEMARK OFFICE
CERTIFICATE OF CORRECTION

PATENT NO. : 4,055,377
DATED : October 25, 1977
INVENTOR(S) : Randall L. Erickson and Terry R. Bailey It is certified that error appears in the above-identified patent and that said Letters Patent are hereby corrected as shown below:

In column 7, line 67, "fields" should be --field--.

In column 11, line 21, "particles" should be --pigment--.

In column 11, line 31, "9" should be --11--.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*